United States Patent [19]

van Wijk et al.

[11] Patent Number: 4,689,738

[45] Date of Patent: Aug. 25, 1987

[54] INTEGRATED AND PROGRAMMABLE PROCESSOR FOR WORD-WISE DIGITAL SIGNAL PROCESSING

[75] Inventors: Franciscus J. A. van Wijk; Jozef L. van Meerbergen; Fransiscus P. J. M. Welten; Robert J. Sluijter, all of Eindhoven, Netherlands

[73] Assignee: U.S. Philips Corporation, New York, N.Y.

[21] Appl. No.: 663,730

[22] Filed: Oct. 22, 1984

[30] Foreign Application Priority Data

Dec. 27, 1983 [NL] Netherlands ......................... 8304442

[51] Int. Cl.⁴ ............................................... G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,503,500 | 3/1985 | Magar | 364/200 |
| 4,538,239 | 8/1985 | Magar | 364/759 |
| 4,577,282 | 3/1986 | Caudel et al. | 364/200 |

*Primary Examiner*—Eddie P. Chan
*Attorney, Agent, or Firm*—Jack E. Haken; James J. Cannon, Jr.

[57] ABSTRACT

An integrated and programmable processor for word-wise digital signal processing. The processor has a multiplier element, an arithmetic and a logic unit, a data memory and a connection for a control memory which may be integrated on-chip. The elements are interconnected by means of a double bus on which addresses as well as data may be transported by means of suitable selectors. Consequently, a pipeline operation can take place within one instruction cycle.

18 Claims, 20 Drawing Figures

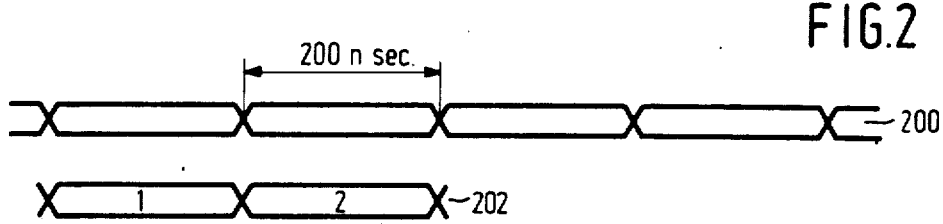
FIG.2
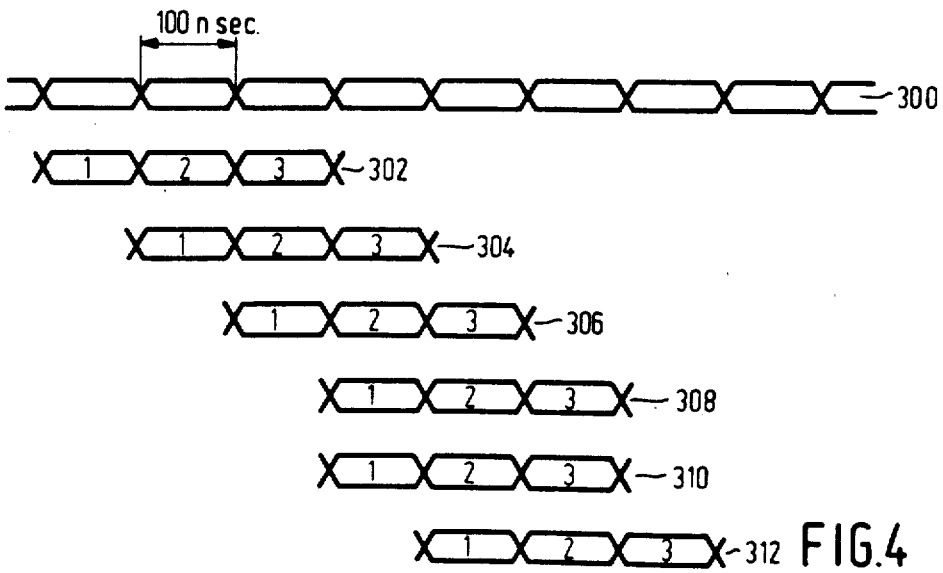
FIG.3
FIG.4

| MNEM | COD | OPERA | | | |
|---|---|---|---|---|---|
| | | $AR_{new}$ | $A_{new}$ | $S_{new}$ | $M_{new}$ |
| NOP | 0 0 0 | AR | A | S | M |
| INCA | 0 0 1 | (A+1)mM | (A+1)mM | S | M |
| DECA | 0 1 0 | (A−1)mM | (A−1)mM | S | M |
| STP | 0 1 1 | (A+S)mM | (A+S)mM | S | M |
| STM | 1 0 0 | (A−S)mM | (A−S)mM | S | M |
| FTCA | 1 0 1 | (A)mM | (A)mM | S | M |
| FTCS | 1 1 0 | (S)mM | A | (S)mM | M |
| BRAS | 1 1 1 | BR((A+S)mM) | (A+S)mM | S | M |
| LDIR | 0 0 0 | BUS | A | S | M |
| LDAA | 0 0 1 | BUS | BUS | S | M |
| LDAS | 0 1 0 | BUS | A | BUS | M |
| LDA | 0 1 1 | ADDR | BUS | S | M |
| LDS | 1 0 0 | ADDR | A | BUS | M |
| LDM | 1 0 1 | ADDR | A | S | BUS |
| LAAS | 1 1 0 | BUS | BUS | BUS | M |
| LALL | 1 1 1 | BUS | BUS | BUS | $\overline{BUS}$ |

FIG.6

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
|   |   | OOR | Z | C | N | O | ACA | ACB | ACR | IE | FOR | – | – | – | – |

OVFL SGNM

FIG. 12

| Mnem | AINS-Field $c_2$ 3 4 5 $c_6$ | Func | Flags Aff Z N C O |
|---|---|---|---|
| COM * | 0 0 0 0 0 | | x x 0 0 |
| AND | 0 0 0 0 1 | | x x 0 0 |
| OR | 0 0 0 1 0 | | x x 0 0 |
| EXOR | 0 0 0 1 1 | | x x 0 0 |
| ADD | 0 1 0 0 0 | | x x x x |
| XADD | 0 1 0 0 1 | | x x x x |
| SUB | 0 0 1 1 0 | | x x x x |
| XSUB | 0 0 1 1 1 | | x x x x |
| NEG * | 0 1 1 0 0 | | x x x x |
| CNEG * | 0 1 1 0 1 | | x x x x |
| XNEG * | 0 1 1 1 0 | | x x x x |
|  | 0 1 1 1 1 | | |
| INC * | 1 0 1 0 0 | | x x x x |
| XINC * | 1 0 1 0 1 | | x x x x |
| DEC * | 1 0 1 1 0 | | x x x x |
| XDEC * | 1 0 1 1 1 | | x x x x |
| NOP * | 1 0 0 0 0 | | – – – – |
| PASS * | 1 0 0 0 1 | | x x 0 0 |
| SWAP * | 1 0 0 1 0 | | x x 0 0 |
| CSUB | 0 0 1 0 0 | | x x x x |
|  | 0 0 1 0 1 | | |
| ADDM | 0 1 0 1 0 | | x x x x |
| XSGN * | 0 1 0 1 1 | | x – x 0 |
| NULL | 1 0 0 1 1 | | x x 0 0 |
| ASL * | 1 1 0 0 0 | | x x x x |
| XASL * | 1 1 0 0 1 | | x x x x |
| LSL * | 1 1 0 1 0 | | x x x 0 |
| LROL * | 1 1 0 1 1 | | x x x 0 |
| ASR * | 1 1 1 0 0 | | x x x 0 |
| XASR * | 1 1 1 0 1 | | x – x 0 |
| LSR * | 1 1 1 1 0 | | x 0 x 0 |
| LROR * | 1 1 1 1 1 | | x x x 0 |

FIG. 13a

| MINS | Jnp Selec | | ACR= |
|---|---|---|---|
| $C_2 C_3$ 4 5 6 7 8 | P= | Q= | |
| 0 0 0 0 0 0 0 | M X L | M Y L | A C R |
| | X | Y | X·Y |
| | X | -Y | -X·Y |
| | M X L | Y | M X L·Y |
| | M X L | -Y | -M X L·Y |
| | X | M Y L | X·M Y L |
| | M X L | M Y L | M X L·M Y L |
| | -1 | -Y | Y |
| | -1 | Y | Y |
| | -1 | M Y L | -M Y L |

FIG. 13b

| DX $C_{19}$ 20 21 22 | dest | DY $C_{23}$ 24 25 $C_{26}$ | dest |
|---|---|---|---|
| 0 0 0 0 | n o n | 0 0 0 0 | n o n |
| 0 0 0 1 | R A M A | 0 0 0 1 | R A M B |
| 0 0 1 0 | A C U R •* | 0 0 1 0 | |
| 0 0 1 1 | A C U B • | 0 0 1 1 | A C U A • |
| 0 1 0 0 | R P R * | 0 1 0 0 | |
| 0 1 0 1 | I A R * | 0 1 0 1 | |
| 0 1 1 0 | | 0 1 1 0 | |
| 0 1 1 1 | S O X | 0 1 1 1 | S O Y |
| 1 0 0 0 | P O | 1 0 0 0 | P O |
| 1 0 0 1 | A D O | 1 0 0 1 | A D O |
| 1 0 1 0 | S I O S T | 1 0 1 0 | S I O S T |
| 1 0 1 1 | I O F | 1 0 1 1 | I O F |
| 1 1 0 0 | P S T * | 1 1 0 0 | |
| 1 1 0 1 | B S R * | 1 1 0 1 | |
| 1 1 1 0 | | 1 1 1 0 | |
| 1 1 1 1 | R File ■ | 1 1 1 1 | R File ■ |

FIG. 13d

| SX $C_9$ 10 11 12 $C_{13}$ | Sel | SX $C_9$ 10 11 12 $C_{131}$ | Sel |
|---|---|---|---|
| 0 0 0 0 0 | ROM | 1 0 0 0 0 | R 0 |
| 0 0 0 0 1 | AD0 | 1 0 0 0 1 | R 1 |
| 0 0 0 1 0 | RAMA | 1 0 0 1 0 | R 2 |
| 0 0 0 1 1 | ARB | 1 0 0 1 1 | R 3 |
| 0 0 1 0 0 | RAMB | 1 0 1 0 0 | R 4 |
| 0 0 1 0 1 | IAR | 1 0 1 0 1 | R 5 |
| 0 0 1 1 0 | SIX | 1 0 1 1 0 | R 6 |
| 0 0 1 1 1 | SOX | 1 0 1 1 1 | R 7 |
| 0 1 0 0 0 | PO | 1 1 0 0 0 | R 8 |
| 0 1 0 0 1 | PI | 1 1 0 0 1 | R 9 |
| 0 1 0 1 0 | SIOST | 1 1 0 1 0 | R 10 |
| 0 1 0 1 1 | IOF | 1 1 0 1 1 | R 11 |
| 0 1 1 0 0 | PST | 1 1 1 0 0 | R 12 |
| 0 1 1 0 1 | BSR | 1 1 1 0 1 | R 13 |
| 0 1 1 1 0 | MSP | 1 1 1 1 0 | R 14 * |
| 0 1 1 1 1 | LSP | 1 1 1 1 1 | PINR * |

| SY $C_{14}$ 15 16 17 $C_{18}$ | Sel | SY $C_{14}$ 15 16 17 $C_{18}$ | Sel |
|---|---|---|---|
| 0 0 0 0 0 | ROM | 1 0 0 0 0 | R 0 |
| 0 0 0 0 1 | ARR | 1 0 0 0 1 | R 1 |
| 0 0 0 1 0 | RAMB | 1 0 0 1 0 | R 2 |
| 0 0 0 1 1 | ARA | 1 0 0 1 1 | R 3 |
| 0 0 1 0 0 | RAMA | 1 0 1 0 0 | R 4 |
| 0 0 1 0 1 | IAR | 1 0 1 0 1 | R 5 |
| 0 0 1 1 0 | SIY | 1 0 1 1 0 | R 6 |
| 0 0 1 1 1 | SOY | 1 0 1 1 1 | R 7 |
| 0 1 0 0 0 | PO | 1 1 0 0 0 | R 8 |
| 0 1 0 0 1 | PI | 1 1 0 0 1 | R 9 |
| 0 1 0 1 0 | SIOST | 1 1 0 1 0 | R 10 |
| 0 1 0 1 1 | IOF | 1 1 0 1 1 | R 11 |
| 0 1 1 0 0 | PST | 1 1 1 0 0 | R 12 |
| 0 1 1 0 1 | BSR | 1 1 1 0 1 | R 13 |
| 0 1 1 1 0 | MSP | 1 1 1 1 0 | R 14 * |
| 0 1 1 1 1 | LSP | 1 1 1 1 1 | PINR * |

FIG.13c

| Funct | PM | SELA1 | SELA2 | ENA |
|---|---|---|---|---|
| HOLD | $PM_{old}$ | $SELA1_{old}$ | $SELA2_{old}$ | 0 |
| "0" | 1 | 0 | 0 | 1 |
| -ACR | 0 | 0 | 1 | 1 |
| +ACR | 1 | 0 | 1 | 1 |
| $-ACR \cdot 2^{-15}$ | 0 | 1 | d.c | 1 |
| $+ACR \cdot 2^{-15}$ | 1 | 1 | d.c | 1 |

INTEGRATED AND PROGRAMMABLE PROCESSOR FOR WORD-WISE DIGITAL SIGNAL PROCESSING

BACKGROUND OF THE INVENTION

1. Field of the Invention

The invention relates to an integrated and programmable processor for word-wise digital signal processing, comprising:
- a. a multiplier element which comprises a first input and a second input for receiving two operands for multiplication and a first output for presenting a product;
- b. an arithmetic and logic unit which comprises a third input and a fourth input for receiving two further operands, a second output for presenting a result operand, and first accumulator means which are connected between the second output and the third output;
- c. a first read-write memory for the storage of data;
- d. connection means for connecting a control memory for the storage of control information for the other components;
- e. communication means, including bus connection means, for connecting said components to one another and to the environment.

2. Description of the Prior Art

A data processor of this kind is known from European Patent Application No. 0086307-A2 assigned to Texas Instruments Incorporated. The known device is an integrated microcomputer in which a program bus and a data bus are provided on the chip; the exchange of program information with the environment is also possible. Furthermore, the output of the multiplier element is directly connected to one of the inputs of the arithmetic and logic unit. It has been found that the flexibility of such a processor cannot be high because of inter alia such a very direct coupling. It has also been found that the presence of only one data bus also reduces the flexibility of the processor.

SUMMARY OF THE INVENTION

It is an object of the invention to provide an integrated data processor which offers a wide variety of uses and which allows high-speed signal processing. Generally, signal processing implies operations which are executed in "real time", so that each operation must be completed within a fixed time interval. Such signal processing operations are often executed as vector operations, which means the formation of a sum of a series of products in which sucessive signal values form one of the factors. Typically the same operations are constantly repeated on successive signal words of a block or series of signal words. However, often other types of operations such as are usually executed in an arithmetic and logic unit (ALU) are also necessary, for example bitwise formation of an OR-function, rotation or shifting.

The object is achieved in that the invention is distinguished from the prior art in that
- said first input is connected to a separate first bus, said second input and fourth input being connected to a separate second bus of said bus connection means;
- said third input can be coupled to the first bus;
- said first accumulator means comprise a third output with a first selector for forming a selectable connection to said first and second bus;
- said first output comprises a second selector for forming a selectable connection to said first and second bus;
- said first read/write memory comprises an address input and a data input which are connected to said first and second bus, and a fourth output with a third selector in order to form a selectable connection to said first and second bus.

This structure is based on the recognition of the fact that a firm coupling between multiplier element and arithmetic and logic unit is usually open to objection for the execution of a mixture of vector operations and other operations in one program. On the one hand, many vector operations only require the multiplier element. Interjection of the arithmetic and logic unit would then cause a delay. For the execution of many other operations, only the arithmetic and logic unit is required. In that case the interjection of the multiplier element would cause a delay. Therefore, it is better to keep the two operations separate, so that the arithmetic and logic unit and the multiplier element can be optimized as regards function spectrum as well as processing speed. The two-bus structure connected to the relevant inputs and outputs in the manner specified increases the flexibility and the processing speed further. For example, for the development of a given program use can now be made of an external control memory which is constructed as an electrically variable memory (NVRAM, RAM, PROM, EPROM or EEPROM). For mass production, however, it will usually be integrated as a programmable read-only memory ($E^2$PROM, EPROM) or read-only memory (ROM). The latter memories are cheaper; a read-only memory occupies only very little space on the chip.

Preferably, said first read/write memory comprises a first memory module whose address input is connected to the first bus and whose data input is connected to the second bus, and a second memory module whose address input is connected to the second bus and whose data input is connected to the first bus, the third selector comprising module a corresponding selection module for each memory which is connected to each of the two buses, the connection for the control memory comprising an instruction register for storing control information for the control of further components, said instruction register also having a data output connected to said bus connection means. Data can thus always be routed in a variety of ways before and after the relevant operations.

Preferably, each of said first and second memory modules comprises its own address calculation unit. A higher flexibility can thus be achieved.

Preferably, said first output comprises retrocoupled second accumulator means, including accumulator adder means, whereto there is connected a shift unit for performing selectable shift and reformatting operations on data to be applied to the bus connection means. Thus, the multiplier element allows for a large number of different operations to be performed without requiring the bus connection means; the latter may then be operative for a preceding or the next processing operation.

Preferably, said first accumulator means comprise a second read/write memory which is capable of storing several operands and which comprises triple addressing means in order to allow for the simultaneous execution of a write operation from the arithmetic and logic unit as well as two independent read operations to and from the first and the second bus, respectively. Thus, a local and hence freely accessible processing memory is available to the ALU unit, so that the execution of a wide range of operations is facilitated.

Preferably, there are provided further connection means for a further data memory which is constructed as a read-only memory and which comprises an address connection to said bus connection means and a selectable data connection to said first and second bus. Such a read-only (data) memory can be advantageously used notably for the storage of coefficient information for said vector operations; as regards the desirability of integration or not, the same holds good as for the control memory already described.

Preferably, said third input comprises selector means for forming a selectable connection to said first and second bus. The arithmetic and logic unit is capable of performing operations on one or on two operands. Thanks to the latter facility, it is now possible to present this single operand each time on the same input of the arithmetic and logic unit, so that the configuration of the latter unit may be simpler.

Preferably, there are provided timing means for controlling a first instruction cycle which comprises the following coincident operations:
  address calculation for a data memory, including associated memory access, in order to make an operand for the bus connection means available during the next instruction cycle;
  a data transport via at least one bus of the bus connection means; and
  a data processing operation in at least either the arithmetic and logic unit or the multiplier element on an operand transported via the bus connection means during said instruction cycle in order to form a result operand during this instruction cycle which is made available for transport via the bus connection means during the next or a later instruction cycle. A given degree of parallellism can thus be achieved within one instruction cycle.

Preferably, there is provided a cycle selector which comprises a first state and a second state in order to control in the first state said first instruction cycle and in the second state a second instruction cycle having a length which amounts to half the length of the first instruction cycle, said second instruction cycle comprising the following coincident operations:
  address calculation for a data memory for the formation of an address for the next instruction cycle;
  memory access in a data memory by means of an address calculated during the directly preceding instruction cycle in order to make an operand available for the bus connection means in the next instruction cycle;
  a data transport via at least one bus of the bus connection means;
  a data processing operation in at least one of the two elements arithmetic and logic unit and multiplier element on at least one operand transported via the bus connection means during said instruction cycle or during a previous instruction cycle in order to form a result operand during the interval of the same instruction cycle pulse the next instruction cycle in order to make this operand available for transport via the bus connection means during the second next instruction cycle or during a later instruction cycle, for which purpose output registers are connected to the multiplier element, and to the first read-write memory, said output registers being transparently activatable in said first state of the cycle selector, there being provided input registers for the arithmetic and logic unit and the multiplier element which are transparently activatable in both states of the cycle selector. By the interjection of the additional registers, uncoupling takes place so that the signals on the input thereof (result of an operation) are uncoupled from the signals on the output of these registers (result of a preceding operation). Due to this uncoupling, a higher processing speed can be achieved without a faster technology being required or a higher clock pulse frequency being used. The processing speed is also increased by extension of the parallel pipelining principle as will be explained in detail hereinafter. It is a minor drawback, however, that programming is now slightly more complex because each instruction word must contain elements of operations whose further execution is controlled only by later instruction words.

Some further attractive details are specified in the sub-claims.

BRIEF DESCRIPTION OF THE FIGURES

The invention will be described in detail hereinafter with reference to the drawings. First a description will be given of a general block diagram of a preferred embodiment, followed by a description of some detailed diagrams and operations.

FIG. 2 illustrates the four types of instructions which can be executed;

FIG. 3 shows a time diagram for the execution of a standard instruction in a normal cycle;

FIG. 4 shows a time diagram for the execution of a standard instruction in an accelerated cycle;

FIG. 6 illustrates the set of instructions of an address calculation unit;

FIG. 12 illustrates the program status register;

FIGS. 13a, b, c, d illustrate a part of the instruction code;

DESCRIPTION OF THE PREFERRED EMBODIMENT

Figure 1:
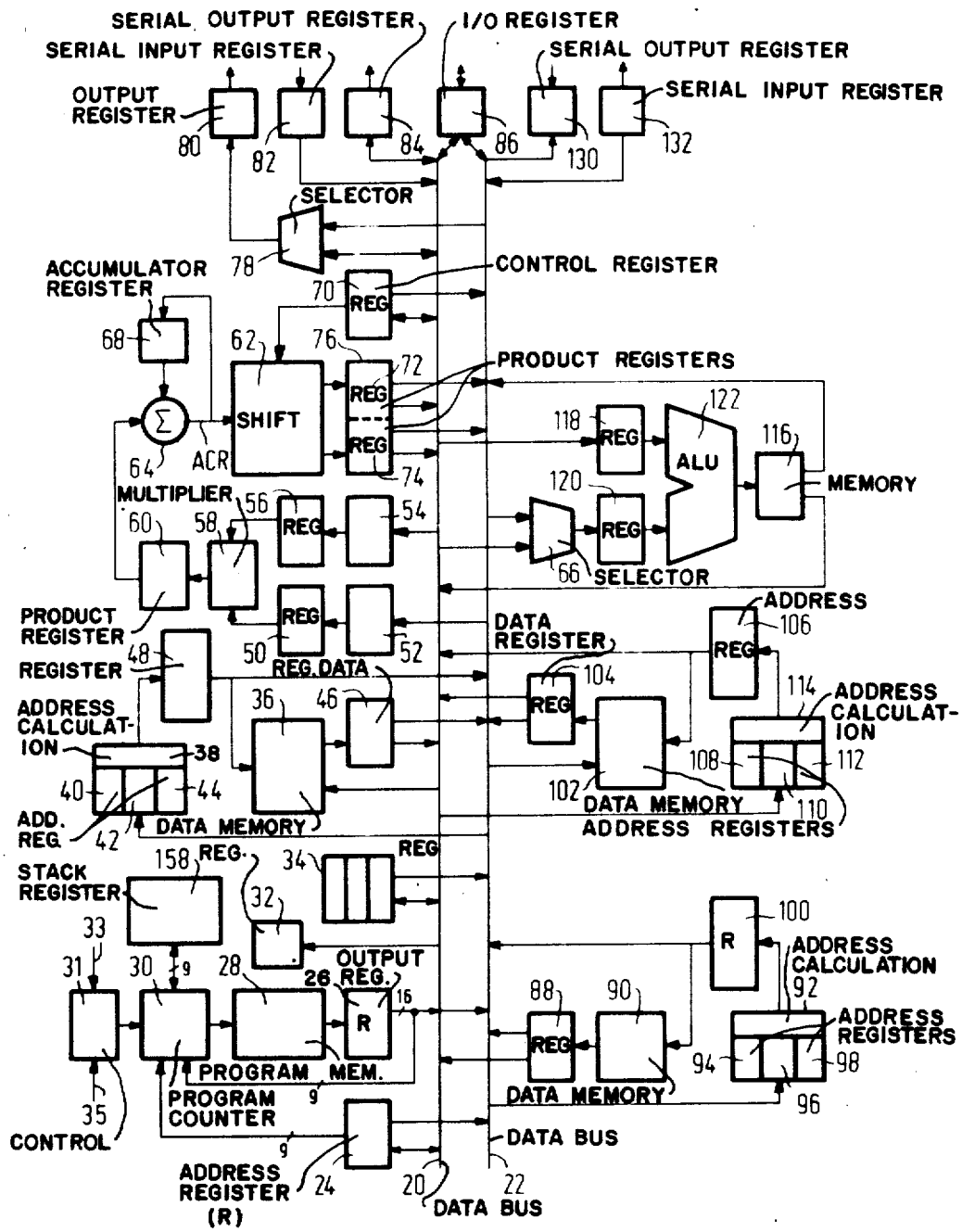
FIG. 1 shows a general block diagram of a data processor in accordance with the invention.

FIG. 1 shows a general block diagram of the data processor in accordance with the invention. The internal connection is realized by a first 16-bit data bus 22 and a second 16-bit data bus 20. The circuit comprises a number of registers, some of which are directly connected to one of the two buses, that is to say elements 24, 26, 34, 46, 48, 50, 56 (the latter two elements via a selection element), 70, 72, 74, 88, 100, 104, 106, 118, 120. Element 30 is a program counter which addresses a program memory 28 having a capacity of 512 words of 40 bits which can be loaded into the output register 26. The execution of these instructions will be described in detail hereinafter: most bits control further functions in the remainder of the circuit via connections/decoders which have been omitted for the sake of simplicity. A 16-bit portion can be applied in parallel to both data buses for one type of instruction. Program counter 30 can be loaded either with 9 bits from the instruction register 26 or with an address from an 8-word stack register 158. The register 24 acts as an interrupt address register and is asymmetrically connected between the two buses (i.e. in the same manner as elements 34, 70, 78 to be described hereinafter: unidirectionally to the bus 22, bidirectionally to the bus 20). This restriction is not essential; for a long instruction word, the number of different functions to be controlled would be larger so that a more universal connection pattern would be feasible. If desired, the memory 28 is not integrated but constructed as a "separate" memory in order to facilitate the programming; in that case forty additional pins are added to the integrated circuit in order to supply the instruction register 26 with information. At least 9 of these forty pins are preferably bidirectionally operative for the supply of an address to the external memory. In a specific embodiment (not shown), the latter number is chosen to be 16, so that the width equals that of the data buses. These forty connection pins operate in time multiplex: alternately address and data.

Element 90 is a data memory which is constructed as a read-only memory for 512 words of 16 bits in the present embodiment. If desired, the memory 90 is not integrated but constructed as a "separate" memory in order to facilitate programming; in that case sixteen additional pins are included in the integrated circuit for the supply of information to element 88. Nine of these 16 pins are bidirectionally operative for the supply of an address to the external memory. They are again operative in time multiplex. Furthermore, elements 36, 102 are data memory modules, elements 38, 92, 114 are address calculation units, and elements 66, 78 are selectors for the two buses. Registers 48, 100, 106 are associated with the address calculation means which will be described in detail with reference to FIG. 5. Furthermore, as is apparent some registers (for example, 88, 104 46, 72, 74, 34) have selective connections to the two buses. Registers 50, 56 operate as registers which are or are not transparent. Element 58 is a 16×16 bit multiplier element with an associated control register 70. Element 64 is a 40-bit accumulator adder. Element 68 is a 40-bit accumulator register. Element 78 is a bidirectional selector. Element 122 is an arithmetic and logic unit. Element 116 is a memory comprising 3 connections (ports) which is used as a set of scratchpad or processing memories. Furthermore, elements 80, 82, 84, 86, 130, 132 are input/output units for communication with the environment.

The registers have the following functions:
24: instantaneous address register for RAM 36 (ARA)
46: data register connected to the output of RAM 36 (DRA)
106: instantaneous address for RAM 102 (ARB)
104: data register connected to the output of RAM 102 (DRB)
50, 56: two registers, transparent or not, which are connected to the inputs of the multiplier element.

During a machine cycle, either the signal arriving on the input appears on the output of the relevant register (transparent) or the signal present in the register itself appears thereon (not transparent). At the end of such a cycle, the signal present on the input of the register (MXL, MYL) is always stored in the register.
60: product register (PR)
68: accumulator register (ACR)
72/74: register sections for the most-significant and the least significant product portion (MSP, LSP)
70: register for the control of the shift element 62 as regards the shifting and the format selection and possibly bit reversal (BSR)
118, 120: two registers which operate transparently or not and which are connected to the input of the ALU 122 (AXL, AYL)
116: fifteen scratchpad registers (RO . . . R14), also representing an accumulator function; physically, this element acts as a memory having three independent access facilities with as many independent addresses and two data outputs and one data input
40, 94, 108: basic address registers (AA, RA, BA)
42, 96, 110: shift address registers (AS, RS, BS)
44, 98, 112: address masking registers (AM, RM, BM)
84, 130: serial output registers for the two buses (SOX, SOY)
82, 132: serial input registers for the two buses (SIX, SIY)
86: multiplexed parallel input/output register (PO, PI)
80: additional parallel output register (ADO).

Functional Description

Synchronized by a clock which is not separately shown, the data processor is capable of executing up to 10 million instructions per second. This is achieved in that several instructions can be executed in parallel by way of a pipeline organization. The two parallel operating data buses are operative to accelerate the transport. Communication with the environment is provided by powerful I/O interface units for serial as well as parallel communication. There are provided three data memories, that is to say two read-write memories and one read-only memory, each comprising its own address calculation unit. The arithmetic and logic unit 122 has a set of instructions yet to be described. The multiplier element 58 is combined with a 40-bit accumulator 64/68 and a general purpose shift unit 62.

Summary of the Instruction Set.

FIG. 2 illustrates the four types of instructions which can be executed. The first two bits indicate the type. The first arithmetic instruction controls in parallel an operation in the arithmetic and logic unit, a bus transport via at the most two buses, and at the most three address calculations. The second arithmetic instruction is the counterpart of the first instruction and controls an operation in the multiplier element. The field AINS-/OPS or MINS controls the operation, SX/DX or SY/DY controls the source elements or destination elements on the two buses, respectively, RFILE acts as an address for the local memory 116, and ACUA, ACUB, ACUR are operative for the control of the address processing elements.

In the third instruction, the branch instruction, the bits 3 to 8 contain a destination address for the branch. BR indicates the type of branch instruction and COND the condition. The bit positions 2 and 27 to 39 are void. Alternatively, also this instruction may contain the ACU fields recited hereabove. Indications for address calculations are then also included in these fields in this particular operating mode.

In the fourth instruction, direct loading, the field DATA indicates the data to be transported on the bus, and the other fields are operative as in the arithmetic instructions. The details of these instructions will be described hereinafter.

With standard instructions each one-word instruction can be executed in 200 ns. With a given program control this can be reduced to 100 ns. This is achieved by elaboration of the pipeline priciple as will be described in detail hereinafter. In this respect FIG. 3 shows a time diagram of a standard 200 ns instruction cycle. The time diagram of an accelerated instruction cycle as shown in FIG. 4 will be described hereinafter. Line 200 in FIG. 3 contains the sequence of instruction time intervals having a length of 200 ns. Crossing lines indicate the connections to preceding/subsequent intervals. Line 202 shows the operations for the fetching of operands. Block 1 offers time space for any calculation of a read address. Due to the organization of the separate memories 36, 102 and 90, this can be performed in an arbitrary combination of these three memories (possibly even in all three memories simultaneously). Furthermore, the relevant memory is read. In as far as a memory serves to supply an operand, in internal/block 2 the information on this line of the relevant location of this memory is valid on the output. On line 204 the processing of the data is symbolized. Block 1 offers time space for the transport of the data on one of the two (or both) transport buses and, whenever applicable, for the actual processing in the multiplier element and/or the arithmetic and logic unit. In given circumstances, however, such an operation will not be activated, for example when only a register to register transfer is performed. During block 2 on this line, any data thus obtained is valid on the output of the relevant processing element. Line 204 shows the further output of the data thus formed. Block 1 thereof offers space for the calculation of an address in one of the two (or both) read-write memories. Block 2 offers time space for the transport via one or both buses 20, 22, possibly to a read-write memory; to this end, an address is then calculated in block 1 of line 206. Thus, between the beginning and the end of an instruction there are three blocks of 200 ns. During the second one of these blocks, however, an address calculation can already be performed for the next instruction. During the third block of this cycle, the processing (multiplier element with accumulator and/or arithmetic and logic unit) can already be performed for the next instruction. During the execution of an instruction in the described manner, the bit FQR in the program status register PST in the element 34 has the value "0". A second, faster operating mode will be described later.

Detailed description of the sub-systems (1) Program memory 28

This memory is addressed by the program counter 30. This counter has the incrementation function (address +1) and the "constant" function (address not modified). Furthermore, the following functions can be performed:
 a CALL instruction
 a JUMP instruction
 a RETURN instruction.

The program counter 30 is controlled by the control unit 31 which comprises a reset input 33 and an interrupt input 35. The state is co-controlled by:
 register 32 which indicates an instruction repeat;
 register bank 34 which contains condition information in register PST for said instruction categories, and also instruction cycle information (FQR) and information concerning the permissibility of interrupts.

These registers 32, 34 can be loaded (34 may also serve as a data source) from the bus 20; therefore, they are asymmetrically connected to both buses.

The actual program counter 30 (9 bits) fulfills the following functions:
 in response to the fetching of each instruction from the memory 28 to the instruction register 26, the program counter is incremented. Upon execution of one of the subsequent, conventional instructions, the value of the address field is transferred as a new address to the program counter:
 jump instructions (if feasible)
 call instructions (if feasible).

For the latter (call) instructions, the content of the program counter is written in the upper register of the stack (8) of registers 158 after incrementation by +1. When a return instruction is executed, the content of the uppermost register of the stack is transferred to the program counter. The interrupt address from the register 24 is transferred to the program counter when the interrupt bit ($\overline{\text{INT}}$) on input 35 gets value 0 while the interrupt is permitted in that the relevant enable bit IE of the register PST has the value "1" and the value of the program counter content incremented by 1 is written on the uppermost stack register.

The register stack comprises 8 registers of 9 bits in a last-in-first-out organization, so that a nested structure of at the most 8 levels is permissible among the subroutines/interruptions.

(2) The data memory modules 36, 102, 90.

The read-only memory 90 has a capacity of 512 words of 16 bits each; the other two modules each have a capacity of 256 words of 16 bits each. The address lengths amount to 9 bits and 8 bits, respectively. The data inputs of the memories 36, 102 are asymmetrically connected to the buses 20, 22. Via selectors, the data outputs are symmetrically connected to the buses, the data being transported via either one or both buses as desired. When the described slow instruction cycle is activated, the output registers 46, 88, 114 are continuously transparent.

(3) Address calculation units.

The address calculation units 38, 92, 41 of the present embodiment are identical, except for their word length of 8 bits and 9 bits, respectively. The address calculation can be coexistent with two arithmetic/move instructions and the load immediate instruction; the address calculations can thus be quickly executed.

Figure 5:
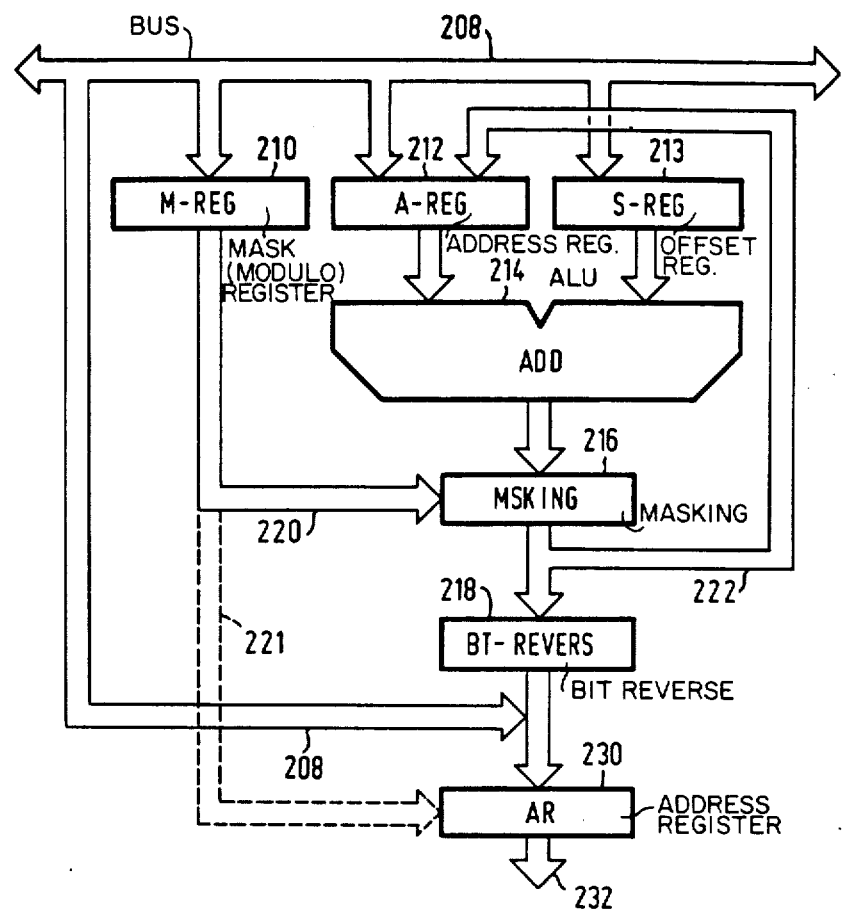
FIG. 5 shows a block diagram of an address calculation unit.

The block diagram of such an address calculation unit shown in FIG. 5 comprises the bus 208 (one of the two buses 20, 22 in FIG. 1) and also all elements up to the connection 232 for the actual memory matrix with address decoder. At the input side there are provided three registers:
 210: for the address mask;
 212: for the actual address where the calculation starts;
 213: for the shift (offset).

The content of these three registers can be retained at the beginning of an interrupt operation for later use during a further operation. Element 214 is an arithmetic and logic unit having a limited bit width and range of operations (with respect to element 122 in FIG. 1). The element 206 is a masking element in which the calculation result of the element 214 can be bit-wise conducted or blocked by the content of the masking register 210. The output of the masking element 216 is connected to the A register 212. Furthermore, in the reversing element 218 the bit sequence can be reversed. The result from the element 218 can be stored in the actual address register 230. The latter register can also be filled directly by data on (a part of) the lines of the 16-bit bus. The masking in the element 216 can be used for cyclically passing through the addresses according to a given module value; the reversal of the bit sequence is used in given versions of Fourier transform calculations. When a masked value ("0") is received in the modulo register 210, the relevant bit position in the register 230 remains unmodified. However, when a value ("1") is received in the modulo register 210, the relevant bit position 230 is updated with a new value. In given circumstances the relevant position may have been the subject of a reversing operation. The control of the register 230 in this respect is denoted by a dotted connection. Actually there is provided a control unit which controls the operations described hereinafter.

In this respect FIG. 6 shows the set of instructions of the address calculations units. They are controlled by relevant fields in the instruction word: C31-33 for the element 38, C34-36 for the element 114, C37-39 for the element 92 (this word is present in the already described register 26). FIG. 6 is divided into two halves; the upper half is applicable when the relevant unit has not been selected as the data destination under the control of the fields DX and/or DY of the micro-instruction word to be described hereinafter. In the opposite case the lower half of the Figure is applicable. The first column shows the mnemonics, the second column the bit pattern, the third to sixth columns the new content for each of the four registers 230, 212, 213, 210 for which "BUS" means that the register is filled with new data from the bus. (A+1) mM means that the address (A+1) is masked by the content of the masking register M; correspondingly, for example, for A−1, A+S and so on. "BR" means that the bit sequence is reversed. The instruction LALL means that the content of the bus (in as far as supplied) is bit-wise inverted. During the loading of the relevant address calculation unit, with or without an "immediate load" instruction, the content of the M register 210 does not influence the actual loading of the AR register 230. The bit positions are not reversed either in that case.

(4) The multiplier element 58.

Multiplication is performed completely in parallel in accordance with the Booth's algorithm described in "A signed binary multiplier technique", by A. D. Booth, Q. J. Mech. Appl. Math. 4 (1951), 236-240, and modified as published inter alia in "A proof of the modified Booth's algorithm for multiplication", but L. P. Rubinfeld, IBEE Trans. Computers (October 1976), pages 1014-1015. From two 16-bit operands on the outputs of the registers 50, 56 a 32-bit product word is formed in one machine cycle. The multiplier element is constructed so that the most significant bit is operative as having a negative value (sign bit). During the processing of operands in multiple precision the less significant parts thereof, therefore, do not comprise a sign bit and the leading bit position must always be filled with a zero. This suppletion itself is described in the earlier, pending U.S. patent application Ser. No. 589,243, filed Mar. 13, 1984 assigned to the assignee of this application, (PHN 10 865) which is incorporated herein by way of reference.

To the output of the element 58 there are connected an accumulator adder 64 and an accumulator register 68, both elements having a width of 40 bits. If necessary, the sign bit in the register 60 (most significant bit of a product) is copied on more-significant bits until a total number of 40 bits is reached. Furthermore two flag bits are provided in the program status register PST in the element 34 (alternatively, this number is increased)

(a) when the permissible limits of the value range are exceeded, an overflow bit OVFL1 is made. The relevant logic function is an EXCLUSIVE-OR function between the two most significant bits of the forty-bit accumulation/adding result.

(b) a second status bit SGNM indicates the sign of the accumulation result. The relevant logic function is an EXCLUSIVE-OR function between OVFL and the most significant bit but one of the accumulation/adding result.

If OVFL obtains the value "1" due to an arithmetic instruction, the bits OVFL, SGNM are fixed. They can then be modified only by program control, for example in that the content of the program status register in the arithmetic and logic unit is subjected to a modification operation. For as long as the bit OVFL retains the value "0", both status bits are interrogated after each arithmetic instruction used by the accumulator. The accumulation result is stored in the register 66 and applied to an element 62 for shift, extraction and reformatting operations. The output of the accumulator register 68 is fed back to the accumulator/adder 64.

(5) Shift element 62.

Figure 7:
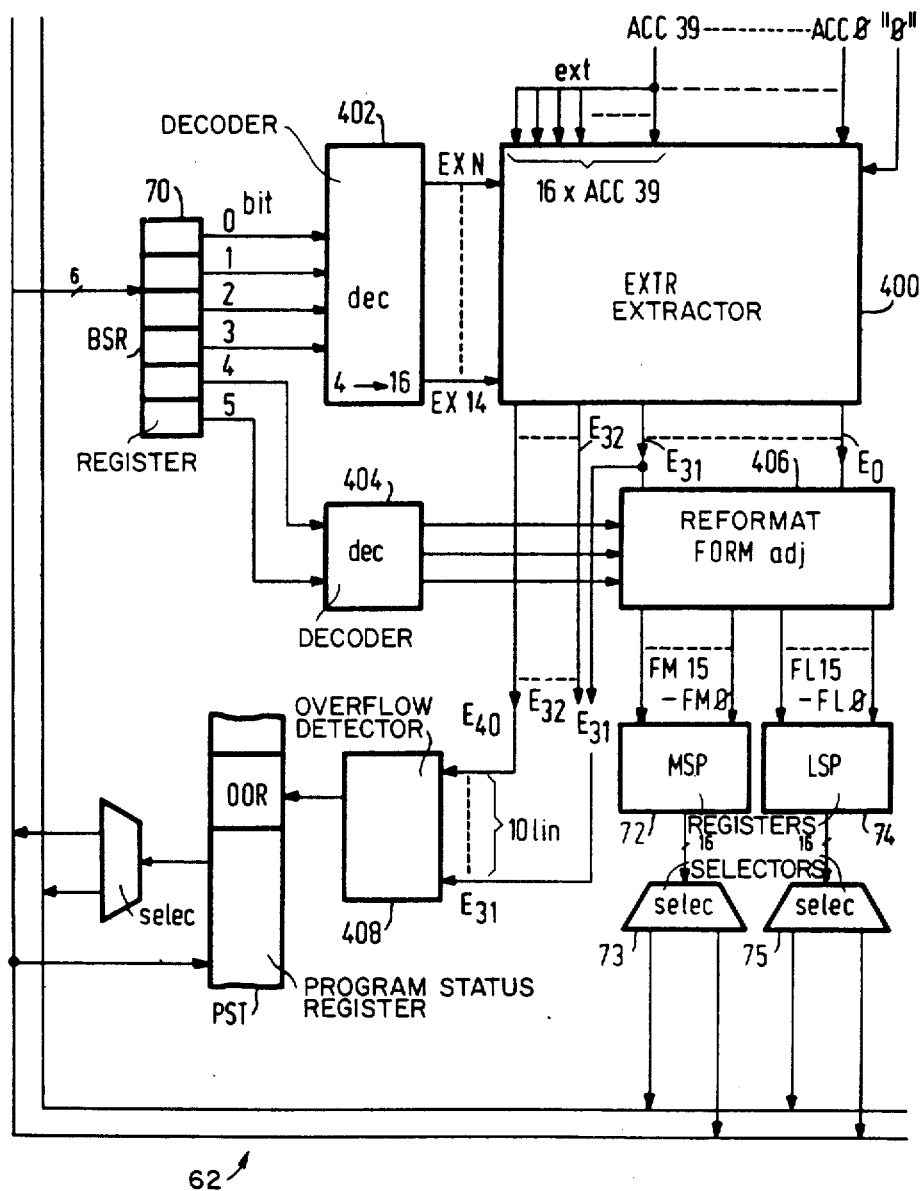
FIG. 7 illustrates the shift/reformatting unit.
Figure 7A:
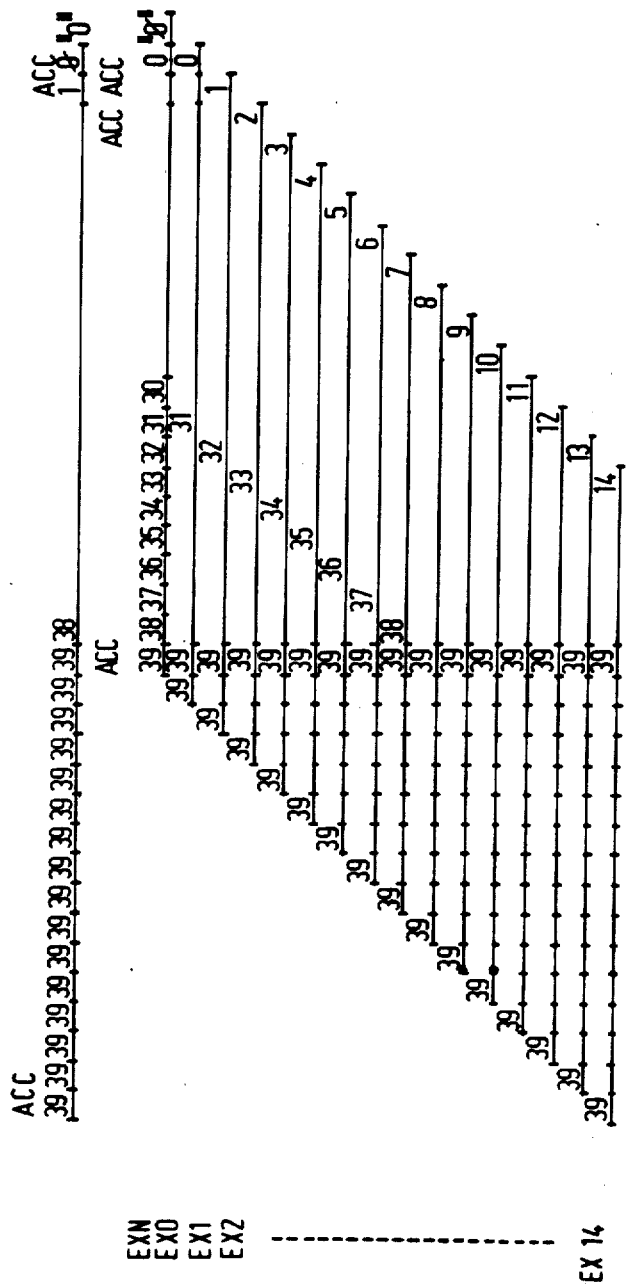
FIG. 7a shows the functions to be realized therein.

FIG. 7 illustrates the shift element 62 in which reformatting operations are also performed. At the top of the Figure, the 40 bits arrive from the accumulator/adder 64. The sign extension operation is included in order to avoid an overflow condition as much as possible. This condition arises when the sum becomes too large due to addition of a number of successive numbers having the same sign. This risk is now reduced. On the input of the extractor 400 the most significant bit ACC39 is extended to fifteen more significant bit positions; this again is done for the detection of any overflow conditions. In the shift element 400 a 32-bit (double length) word is extracted from the 55 bits thus received. Af the left of the Figure there is shown a register (70) BSR which contains a four-bit code (bit 0 ... 3). This code is decoded by the decoder 402. In this respect FIG. 7a shows the sixteen different extraction possibilities; the accumulator bits are supplemented by a least significant "0". Thus, the bits BSR 0 ... 3 with the codes 0000 .. . 1111 form sixteen staggered extracts of 32 bits each. The register 70 should be filled at least one instruction cycle before the actual extraction operation. The bits BSR 4, 5 are decoded by the decoder 404 which activates the reformatting device 406. The 32 extracted bits are referred to as E31 ... E0. The values of the bits BSR4, 5 control the following reformatting operation:

00: the extraction 32-bit word is available to a user in the form of two half words;

1∅: the most significant bit of the least significant half word becomes "∅" and the remainder is shifted one position in the less-significant direction; the last bit of the extraction result is thus suppressed;

∅1: as ∅∅, but the bits of the least significant half word are reversed.

The elements 72, 74 are registers; the selection on the output thereof to the two buses is now denoted by separate selectors 73, 75 (not in FIG. 1). In addition to the 32 bits to be applied to the element 406, the extractor 400 also applies 9 more significant bits E31 . . . E40 to the detector 408 which forms an overflow detector (and also receives bit E31). Should an inadmissible bit value (differing from E31) occur among these 9 bits, bit OOR in the program status register is set to "1"; this is because the relevant more significant bits must be repeats of the sign-indicating bit E31. The field MINS in the instruction which controls functions will be described in detail hereinafter.

(6) The ALU unit 122.

Figure 8:
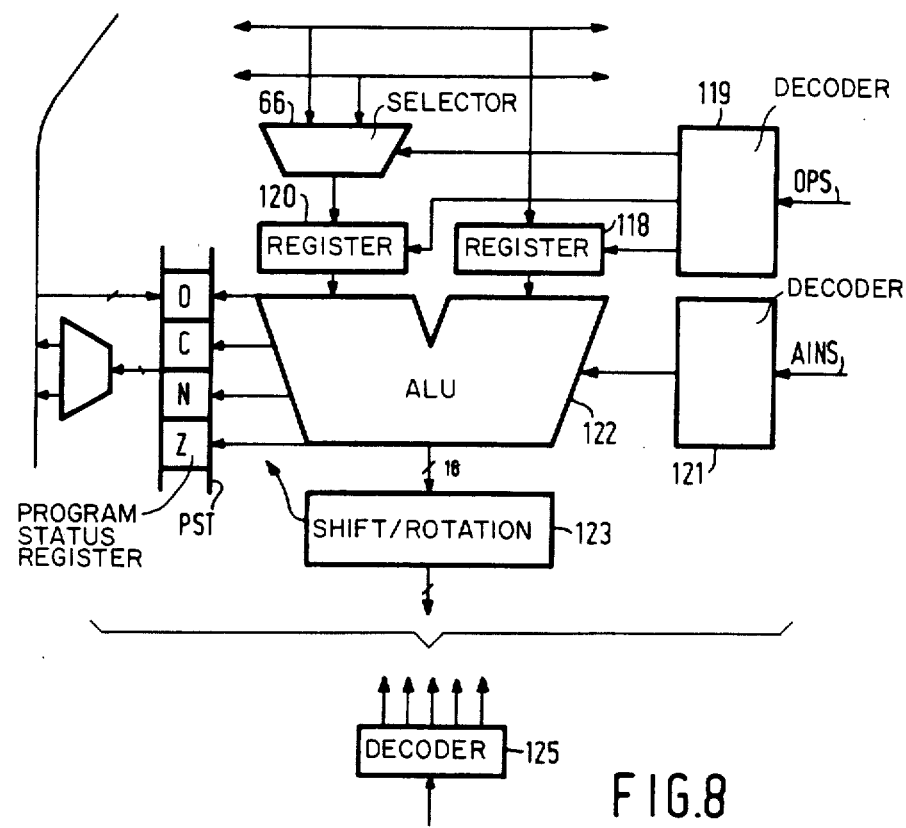
FIG. 8 illustrates the arithmetic and logic unit.

FIG. 8 shows a block diagram of the arithmetic and logic unit 122 and its environment. The blocks 66, 118, 120, 122 are shown in FIG. 1. Block 119 represents a decoder for the field OPS for the instructions. Block 121 represents a decoder for the block AINS of the instruction. Block 125 represents a decoder for the relevant SX, SY, DX, DY fields of the instruction. To the output of the ALU element 122 there is connected a block 123 for the shift and rotation functions which will be described in detail hereinafter. The program status register PST is connected, using decoding elements not shown to the ALU 122 and the shift/rotation functions in the block 123.

The unit 122 operates in two's complement notation. Flag bits can be formed (a higher number would be feasible):

Z: result of the ALU operation is "zero";
N: result (interpreted as 2's-complement number) is negative;
C: there is a carry signal, which may occur in unsigned arithmetic operations for any less significant part of multiprecision words;
O: overflow condition, which implies an error in the case of 2's complement notation. The bit "Z" is thus formed by detection of all bits of the operand together; the bits C and N are formed by detection of a single bit, the overflow condition being detected in the same manner described previously for the multiplier element.

The following operations are defined:
1. COM logic complement
2. AND logic AND-function
3. OR logic OR-function
4. EXOR logic EXCLUSIVE-OR function
5. ADD addition
6. XADD extended (multiprecision) addition; this means that during previous treatment of a less significant part of the operand any carry signal is stored for later treatment of a more significant part of the operand.
7. SUB subtraction
8. XSUB extended (i.e. multiprecision) subtraction; again a bit signal is carried between successively treated parts of an operand in given circumstances
9. NEG an arithmetical inversion
10. XNEG extended (multiprecision) inversion
11. CNEG conditional inversion
12. —
13. INC incrementation
14. XING extended (i.e. multiprecision) incrementation
15. DEC decrementation
16. XDEC extended (i.e. multiprecision) decrementation
17. NOP no action, flag bits retained
18. PASS conduct operand without modification
19. SWAP more significant and less significant bytes are interchanged
20. CSUB conditional subtraction
21. —
22. ADDM add most significant bit of operand B to operand A
23. XSGN copy N flag bit (indicating the sign) over 16 bits; therefore, this is a "sign extension" as described for the multiplier element.
24. ASL arithmetical shift to the left (more significant direction)
25. XASL extended shift ditto
26. LSL logic shift to the left
27. LROL logic rotation to the left
28. ASR arithmetical shift to the right
29. XASR extended shift according to 28
30. LR logic shift to the right
31. LROR logic rotation clockwise
32. NULL generate output "0".

In the above list logic operations are performed at the bit level. For arithmetical operations, the sign bit or bits is (are) treated in a specific manner in given circumstances. For the rotation operations, the shifted out bit is added to the operand again at the opposite end. For details of the sub-fields of the instruction, reference is made to the FIGS. 13 (a–d). The connection of the program status register PST (via a selector) to the bus connection means is shown in simplified form.

Figure 9:
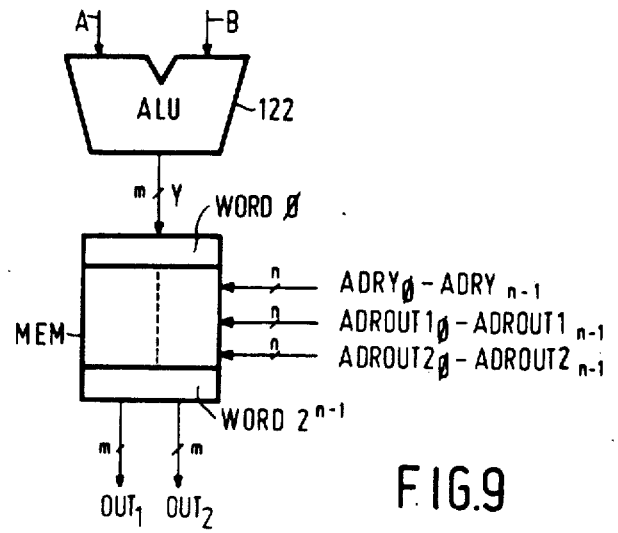
FIG. 9 illustrates the local processing memory.

FIG. 9 shows details of the structure of the first accumulator means. It will be apparent that the accumulator adder 122 is situated within the ALU. The memory MEM consists of a memory bank for $2^{2-n}$ words of $m=16$ bits each. It has a data input Y and two data outputs OUT1 and OUT2, each m bits wide. There are three separate address inputs ADRY, ADROUT1 and ADROUT2, each having a width of n bits (in this case $n=4$). The first one is a write address, the other two being read addresses, each for the associated data connection. The three connections can be simultaneously and independently operative in one and the same instruction cycle.

(7) Interrupt address register 24:

Register 24 is to be loaded from one of the buses and contains an address which is transferred to the program counter 30 at the beginning of an interrupt operation.

(8) Program status register.

In this respect reference is made to FIG. 12 which shows the bit-wise subdivision of the sixteen-bit program status register (in element 34 in FIG. 1). The bits have the following meaning:

∅, 1: OVFL, and SGNM, the two bits disclosed with respect to the multiplier element and its environment
2: OOR, overflow condition of the extractor
3–6: Z.CNO, the four bits described with reference to the ALU unit,
7–9: three flags reserved for the address calculation units
10: IE interrupt admissible/not admissible 11: FQR, instruction cycle selection bit; the last two bits can be modified by program control 12-15: not used (9) Input/output status register (IOF).

This register forms part of the register bank 34 which comprises three registers. It contains status information and flag bits for communication with the environment. The bits have the following meaning: SIXACK denotes the degree of filling of the register 82 with valid information. SIYACK does so for the register 132. SOXACK indicates whether the register 84 is loaded with data. SOYACK serves the same purpose. PIACK : a transition from low to high on the $\overline{WR}$ pin sets this flag bit to "1", synchronized by the separate clock (not shown) of the processor. When the data is read from the PI register (86), this flag is set to ∅ again. POACK : a transition from low to high on the $\overline{RD}$ pin sets this flag bit to "1", synchronized by the internal clock. When data is written in the PO (86) register, this flag is set to ∅ again. Two bits IFA, IFB in this register contain flag bits to be defined by a user; these flag bits may be interrogated via connection pins which are reserved on the integrated circuit for this purpose during the gesting of jump conditions.

(10) Instruction repeat register 32.

This register 32 acts as a hardware instruction counter; when it is loaded with the value N, the next instruction is repeated N times. This register is decremented in reaction to the execution of |any| instruction, while the program counter in the element 30 can be incremented only when the content of register 32 is zero. Such repeating can be advantageously used for vector operations.

(11) Description of the input/output structure.

The SOX (84) and SOY (132) connections can output data from the relevant data buses to the environment. To this end, each connection comprises a 16-bit register which can be synchronized by an external clock connection. These registers also receive internal request and enable signals as a synchronization handshake for a filling operation. Both outputs have a presettable counter for indicating the number of bits to be outputted.

The SIX (82) and SIY (130) connections can receive data from the environment for output to the relevant data buses. To this end, each connection comprises a serial input shift register which can be synchronized by an external clock connection. The input shift register is connected in parallel to a buffer register for the feeding of the bus. Finally, these registers receive internal request and enable signals as a synchronization handshake for a read operation from the parallel register. There is also provided a presettable counter for controlling the number of bits to be loaded onto the buses in parallel.

The PI/PO (86) connection provides parallel transport to and from the processor, respectively. To this end, a 16-bit register is provided each time.

The additional output connection ADO (80) provides external transfer of data or addresses; the latter are calculated in an address calculation unit or in the arithmetic and logic unit. In this case there is provided a register which is to be selectively filled by both buses. These structures will be described in detail hereinafter with reference to some Figures.

(12) Series connection status register (SIOST):

This is the last register of the register bank 34 which contains status information concerning the serial connections. The first four bits SILX3 ... 0 of the 16 bits (actually the bit SILX ∅ is the first bit of this status word) contain the word length for the series input shift register (of connection SIX); code 0000 means a word length of 16 bits and so on, so that finally the code 111 means a word length of 1 bit. The sequence bits SOLX3 ... ∅ the same for the connection SOX, the bits SILY3 ... ∅ the same for the connection SIY, and the bits SOLY 3 ... ∅ the same for the connection SOY.

The interrupt mechanism:

External interrupt signals are represented by a low signal on the pin $\overline{INT}$ during at least 200 ns. This pin is interrogated every instruction cycle and so is the bit EI (enable bit) in the program status register. If EI = 1 and $\overline{INT}$ = 0, a branch operation is performed in the same cycle to the interrupt address (IAR register) and the bit IE is set to "0", the return address (content of program counter +1) being stored on the register stack. The switching over of the bit IE to "1" is performed under program control, after which in given circumstances the treatment of a next interrupt may commence. If subsequently $\overline{INT}$ = 1 for an entire instruction cycle, all interrupt requests have been dealt with. Subsequently, the most recent return address is recalled from the stack registers.

Considering the size of the stack registers, 8 successive interrupt levels can be concurrently nested. The same is applicable to successive interrupt routines.

Finally there is provided a reset pin for resetting the ($\overline{RST}$) processor when this pin carries a low signal for at least 200 ns. The signal is stored in a flag flip-flop.

Parallel input/output structure

Figure 11:
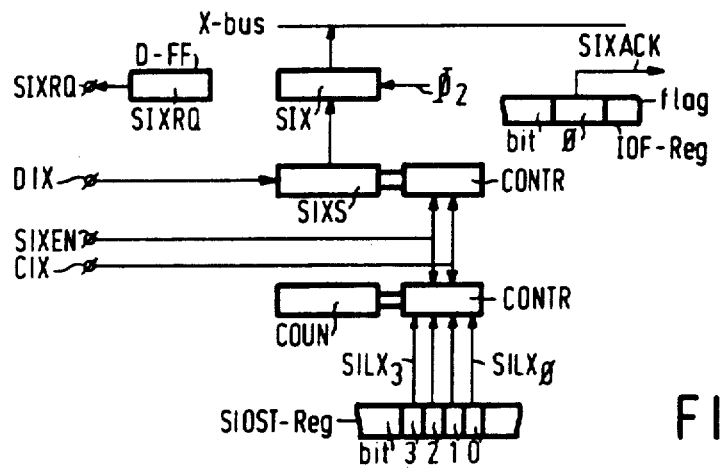
FIG. 11 illustrates the serial data input.
Figure 11A:
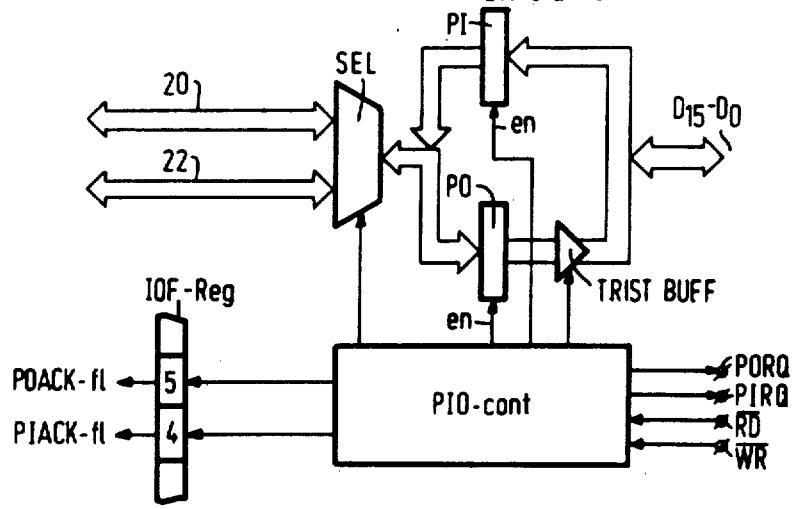
FIG. 11a illustrates the parallel data input/output.

FIG. 11a diagrammatically shows the input/output structure (parallel section). The buses 20/22, a 16-bit selector structure SEL, two parallel registers PI/PO, a tristate buffer TRISTBUFF, the external 16-bit bus D15 ... D0, a control unit PIOCONTR, and the control bits PIACK, POACK are shown. The signals $\overline{RD}$ and $\overline{WR}$ to be supplied by an external device have already been described. The bits PIRQ/PORQ are request bits to the environment.

Figure 10:
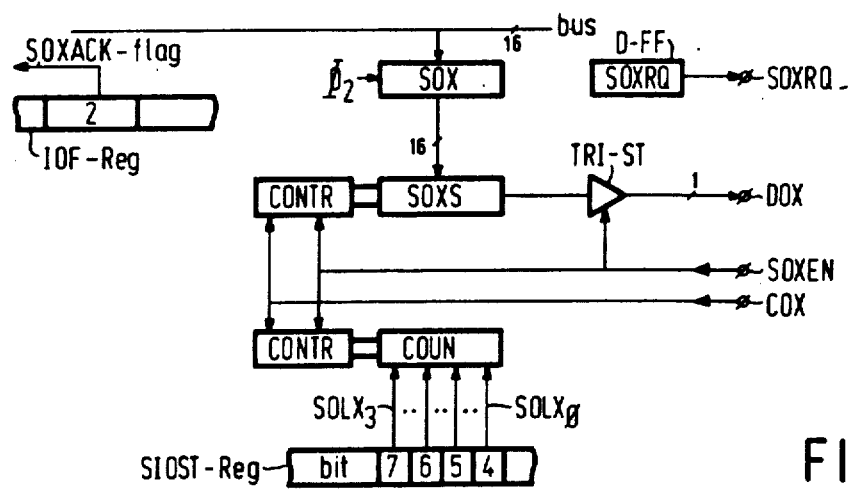
FIG. 10 illustrates the serial data output.

FIG. 10 diagrammatically shows one of the two serial output connections. The output register (in this case SOX) is directly connected to the bus and feeds the output shift register SOXS. The presettable counter COD which can be loaded by the SIOST register is also shown. Output data may be taken up in SOXS only when this register is completely empty (determined by the counter content); in reaction thereto, SOXACK is set to "1" and new data may be applied; SOXRQ = 1 indicates a request to the environment and the counter is loaded. The output of the data to the environment commences when the pin SOXEN becomes "1", synchronization being performed by clock pulses on pin SOX. The tristate buffer TRIST is co-controlled by the value SOXEN. After the counter stops counting and no further data is waiting (SOACK = 1), bit SOXRQ is set to "0" so that SOXS and the counter assumes the "hold" state so that the last bit outputted remains on the pin DOX. When SOXEN becomes "0", the output circuit DOX assumes the high impedance initial state again.

FIG. 11 shows the serial input structure (in this case shown for the X-bus), comprising register SIX, input shift register SIXS, presettable counter COUN, and control and flag bit positions. When SIX is internally addressed as a data source, the flag SIXACK is set to "0" in the register IOF; it is valid for the next processor cycle. Data received in the shift register SIXS is transferred to the register SIX if the counter content indicates that the shift operation has been completed; the flag SIXACK then also becomes high in order to indicate the availability of data to the processor. At the same time the flag bit SIXRQ becomes high in order to inform the environment that the shift register SIXS may receive new data, the counter being loaded again with the length-indicating bits SILX3 . . . SILX0; when this counter has been reset, the next data is completely present in the shift register SIXS. The serial input commences as soon as the input bit SIXEN becomes high after SIXRQ has become high. Synchronization is provided by the the serial clock CIX. When the counter has been completely reset and there is still data which has not been transferred to the register SIX, the flag bit SIXRQ is set to "0" so that the counter and the shift register SIXS directly assume the "hold" mode.

Description of the Fast Mode of Operation

The operation of the processor has been described thus far for a 200 ns instruction cycle. When more use is made of a pipeline mechanism, the processor is also capable of implementing an instruction cycle of only 100 ns. In this respect reference is again made to FIG. 1; notably the registers 60 (at the output of the multiplier element), 46, 104, 88 (at the output of the data memory) also form part of the pipeline structure.

FIG. 4 shows a time diagram for the operation. Therein, the bit FQR in the program status register PST continuously has the value "1".

In the "ALU" instruction, the following operations can be performed in parallel:
 an arithmetic/logic operation;
 at the most three address calculations for the memories;
 addressing of at the most three memory output registers;
 data transport on one or both buses.

In the "multiplication" instruction, the following operations can be performed in parallel:
 a multiplication operation;
 an accumulation/shift operation (elements 62, 64);
 at the most three address calculations for the memories;
 addressing of at the most three memory output registers;
 data transport on one or both buses.

In the "immediate load" instruction, the following operations can be performed in parallel:
 transporting data from the data field of the instruction (in IR) to a destination on the X and/or Y bus;
 at the most three address calculations for the memories;
 addressing of at the most three memory output registers.

Line 300 in FIG. 4 indicates the successive cycles. One line 302 block 1 shows the address calculation. Block 1, line 304 represents the "read" access by way of the previously calculated address. The next block 2 indicates the time during which the data is valid in the output register of the memory thus addressed. Block 1 of line 306 indicates that the transport takes place via the bus (buses) and possibly the processing in ALU and/or the multiplier element. Line 308 of block 2 (which is two blocks later than the block 1 on the line 306 in which the processing is initiated) indicates that the processing result in valid in the output register of the multiplier element when addressed. On the other hand, an operation can similarly be performed in the ALU unit. Line 310 of block 1 indicates (in time before block 2 on line 308) that the address calculation for the next write operation (for the calculation result) may take place (in time before block 2 on line 308). On line 312 block 1 indicates that a bus transport and possibly a write access in a memory take place.

The instruction register must now receive new data every 100 ns (so twice as fast as previously). The register BSR must now also be filled one instruction cycle before the actual shift/reformatting operation and must remain valid for at least one instruction cycle. The flag bits EI (for the interrupt) and RESET (for resetting) are now interrogated every 100 ns.

A small difference with respect to the operations during the "slow" instruction cycle is that the output registers of the memories now act as source elements for the data bus (buses) instead of these memories themselves. Furthermore, all branch instructions and interrupt requests must always be followed by an instruction which does not imply an operation (NOP); the content of the memories is thus saved.

Detailed Description of the Instruction Set

Referring to FIG. 2 again which shows the main types of instruction words, some specific instruction fields will be described in detail hereinafter. FIG. 13a shows a table of the instruction field AINS of the arithmetic instructions. The first column gives the mnemonics. The second column shows the binary code. The last column shows the operation on the flag bits Z, N, C, O. An asterisk in the first column means that only one operand is processed; consequently, this operand must arrive in the arithmetic and logic unit necessarily via the selector 66. A cross in the fourth column indicates that the filling of the relevant flag bits is determined by the result of the operation. A "zero" (0) indicates that the relevant flag bit must be reset to zero. A horizontal dash indicates that the flag bit remains unmodified in all circumstances.

The field OPS selects the operands for the two inputs A (via register 120) and B (via register 118). For the two-operand instructions, the bit C7 provides the control for the B input: "0" gates an operand from the bus 22; "1" gates the operand present in the register 118. Bit C8 provides the control for the A input: "0" gates the operand of the bus 20 and "1" admits the operand already present in the register 120. For the one-operand instructions (denoted by an asterisk in FIG. 13a), the register 118 is in the "hold" state, the codes 00, 01, 10 successively selecting the register 120, the bus 22 and the bus 20 in order to perform the operation on an associated operand. For the operation SWAP, the register 118 is in the hold mode; the code 01 selects the bus 22 and the code 10 selects the bus 20 for the operation; the register 120 is transparent.

FIG. 13b shows a table of the field MINS of the arithmetic instructions. There are seven code bits for 45 codes, so that a given degree of freedom of definition is obtained in order to facilitate the decoding. The codes can be divided into five groups, only the first group being shown in its entirety. The first column offers space for the code bits. The second column indicates the selection function for the elements 50/52. Thus, a transparency can be controlled (X) to the bus, or the content of the register can be used (MXL). Finally, a multiplier factor "−1" can be introduced. The third column indicates the selection function for the elements 54/56. A transparency (Y) can now be controlled to the bus, or the content of the register can be used (MYL); furthermore, the transparency can be controlled with an inversion. Always 200 ns is required for a multiplication operation. The fourth column shows the product thus formed.

The second group of codes is identical to the first group; moreover, the accumulator/adder 64 is activated in order to add the content of the register 68 with a positive sign to the product of the two factors. The third group is identical to the second group, except that the content of the register 68 is now preceded by a negative sign. The fourth group is identical to the second group, except that the content of the register 68 is now shifted to the right through 15 bit locations (multiplication by $2^{-15}$). The fifth group is identical to the fourth group, except that the (shifted) content of the register 68 is now preceded by a negative sign.

FIG. 13c shows two tables for the bus 20 and the bus 22, respectively, in order to indicate that these elements are capable of acting as a source for the bus. Herein, ROM indicates element 90, ADO: element 80, RAMA: element 36, ARB: element 106, RAMB: element 102, IAR: element 24, SIX, SOC, PO, PI: the elements of the input/output structure SIOST, PST, IOF: the registers of the bank 34, BSR: element 70, MSP/LSP: elements 72/74, R∅ . . . R14: the registers of the bank 116, and PINR the same as PI without treatment of pin PIQR. Finally ARR is element 100, ARA element 48.

FIG. 13d shows two tables for the fields DX, DY. Therein, the elements ACUA, ACUB, ACAR are the address calculation units of the memories 36, 102, 90 respectively The instruction field for this address calculation unit determines which local register is loaded. For the element 116 the field R-file selects which of the registers is loaded.

Finally the connection pins for signals will be described.

CLK: clock for synchronizing internally derived clock signals
$\overline{\text{RST}}$: reset pin
D∅ . . . D15: bidirectional I/O data pins
$\overline{\text{INT}}$: pin for external interrupt
IFA, IFB: two flags to be defined by the user
A15 . . . A∅: extra data outputs (parallel)
DIX, DIY: serial data inputs
DOX, DOY: serial data outputs
SOXRQ, SOYRQ: serial input requests
SOXEN, SOYEN: serial enable signals
COX, COY: external asynchronous clock for serial data output
SIXRQ, SIYRQ: request signals serial data input
SIXEN, SIYEN: enable signals serial data input
CIX, SIY: external asynchronous clock for serial data input
$\overline{\text{RD}}$, $\overline{\text{WR}}$: read-write control for parallel I/O registers
PORQ, PIRQ: request signals parallel input/output
SYNC: output clock signals (in synchronism with instruction cycle) for synchronizing an external device.

Figures 14, 14A:
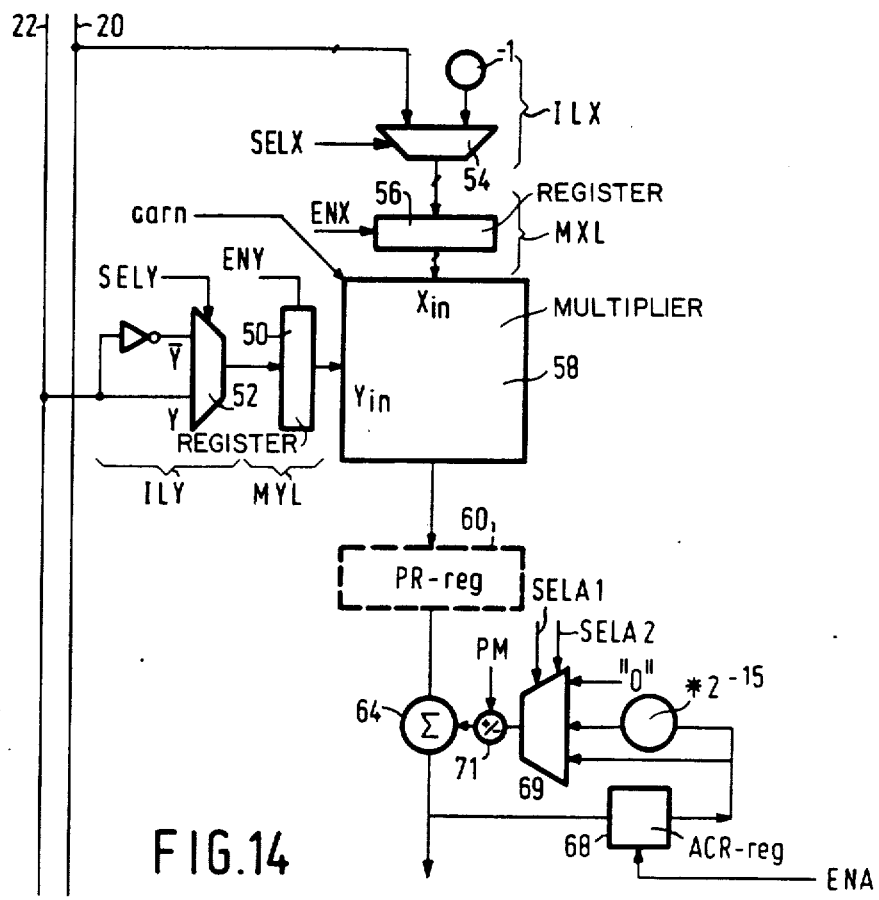
FIG. 14 illustrates the multiplier element.
FIG. 14a illustrates a control table for accummulator/adder of FIG. 14.

FIG. 14 illustrates the multiplier element; the circuit arrangement will first be described. Corresponding elements are denoted by the same reference numerals as used in FIG. 1. Bus 20 is connected to the X-selector 54. Under the control of the bit SELX, the selector conducts either the bus operand or a value "−1" which is formed by a signal generator (not shown). Register 56 is made selectively transparent under control of bit ENX. The bus 22 is connected to the Y-selector 52. Under the control of the bit SELY, the selector gates either the bus operand or the arithmetically inverted value thereof. As a result of the two's complement notation used, this conversion is very simple. Register 50 is transparent or not under the control of the bit ENY. Thus, in the described manner three possibilities can be selected by the two control bits for each input of the multiplier element. The multiplier element 58, moreover, receives a carry input signal: CARR. To the output of the multiplier element 58 there is connected a register PR. The accumulator/adder 64 does not receive special function signals. The accumulator register 68 receives an enable signal ENA. Selector 69 is connected to the output of register 68 to allow the operand stored therein to be transferred, either without modification or shifted over 15 bit positions in the less significant direction. The latter is again effected by the staggering of the connections. The selector 69 also receives an operand "0". Between the selector 69 and the accumulator/adder 64 there is also included an inverter 71 which is selectively activatable by a signal PM.

The output of the accumulator/adder 64 is also connected to the shift element 62 which will not be described again herein. The FIG. 14a also shows a control table with six functions to be controlled for the element 64 in the first column. The right-hand columns of the Figure contain the required control signals. On line 1, the signals PM and SELA 1, 2 retain their previous value: the content of the register 68 then remains the same.

What is claimed is:

1. A programmable integrated circuit digital signal processor comprising:
   a. a first (22) and a second (20) bus for mutually independent word-wise transports;
   b. a multiplier element (58) having a first input fed by said first bus, a second input fed by said second bus, and a first output coupled to a product selector (76), said product selector for selectably connecting said first output to said first and second buses;
   c. an arithmetic and logic unit (122) having a third input means being selectively coupled to said first bus via a connecting means, a fourth input means (118) connected to said second bus, and an output selectably coupled to said first and second buses via an accumulator means (116);
   d. data read-write memory means having a first memory module whose address input is connected to said first bus and whose data input is connected to said second bus, and a second memory module whose address input is connected to said second bus and whose data input is connected to said first bus for simultaneous reception of an address word and a data word respectively, and having an output connected to a selector means (46, 104), said first and second memory modules being selectably coupled to said first and second buses via selector means (46, 104);
   e. a connection means for a program memory (28) connected to said first and second buses for transmitting thereto address information and receiving therefrom control information for controlling components of said processor; and
   f. input/output means (80, 82, 84, 86, 130, 132) bidirectionally connected to both said first and second buses.

2. A processor as claimed in claim 1, wherein said connection means comprises an instruction register for storing an instruction (26) read out from said program memory.

3. A processor as claimed in claim 2, wherein said first and second module each comprise an address calculation unit (38, 114) fed by said associated address input.

4. A processor as claimed in claim 1, wherein said multiplier element is coupled to said first output via a series connection of an accumulator adder (64) retrocoupled via an accumulator register (68), and a shifter (62) for selectably executing shifting and reformatting operations on a product received.

5. A processor as claimed in claim 4, wherein said first and second inputs have first and second registers (50, 56) each having associated transparent and holding states, respectively.

6. A processor as claimed in claim 5, wherein at least one of said first and second registers has invertor means for selectively inverting an operand received and fixed value generation means for presenting a fixed-value-operand to said multiplier element.

7. A processor as claimed in claim 4, wherein said accumulator register has second invertor means for selectively inverting an operand received and shifting means for shifting an operand received over a multibit shift distance in a multiprecision multiplication.

8. A processor as claimed in claim 4, wherein said accumulator adder has sign bit extension generating means for a produce operand received.

9. A processor as claimed in claim 8, wherein said shifter has second sign bit extension generating means for an operand received therein and extractor means for providing a selectable extract of the latter operand inclusive of at least one extended sign bit to said selector.

10. A processor as claimed in claim 1, wherein said output accumulator means (116) comprise a multiword second read write memory having triple addressing capability for executing a simultaneous write operation on an output word from said arithmetic and logic unit and two read operations for forwarding respective words to said first and second bus.

11. A processor as claimed in claim 1 or 2, furthermore having said program memory on-chip.

12. A processor as claimed in claim 1 or 2, wherein there are provided further connection means for a read-only data memory which has a third address input connected to at least one of said first and second bus and a data connection means (88) selectably connectable to said first and second bus.

13. A processor as claimed in claim 12, wherein said read-only data memory comprises a further address calculation unit (92).

14. A processor as claimed in claim 12, wherein said read-only data memory is an on-chip memory.

15. A processor as claimed in claim 1, wherein said third input comprises an input selector (66) selectably connectable to said first and second bus.

16. A processor as claimed in claim 1, further comprising pipelining control means for in controlling a single instruction cycle the following coexisting operations:
   address calculating for said data memory means and an associated memory access for preparing an operand for bus transport in a subsequent instruction cycle;
   transporting an operand along at least one bus from a source element to a destination element;
   activating at least one of said multiplier element and said arithmetic and logic unit for processing an operand for bus transport in a subsequent instruction cycle.

17. A processor as claimed in claim 1, 2 or 3, wherein at least one address calculation unit is provided having a mask register for executing a bit-wise maskable address operation.

18. A processor as claimed in claim 17, wherein said address calculation unit furthermore has an absolute address register and a relative address register feedable by at least one of said first and second buses.

* * * * *